United States Patent
Ljung et al.

(10) Patent No.: US 10,535,254 B2
(45) Date of Patent: Jan. 14, 2020

(54) ELECTRONIC DEVICES, METHODS, AND COMPUTER PROGRAM PRODUCTS FOR DETECTING A TAG HAVING A SENSOR ASSOCIATED THEREWITH AND RECEIVING SENSOR INFORMATION THEREFROM

(75) Inventors: Peter Ljung, Lund (SE); Johan Wadman, Lund (SE)

(73) Assignee: Sony Corporation, Tokyo (JP)

( * ) Notice: Subject to any disclaimer, the term of this patent is extended or adjusted under 35 U.S.C. 154(b) by 864 days.

(21) Appl. No.: 13/818,479

(22) PCT Filed: Feb. 13, 2012

(86) PCT No.: PCT/IB2012/000256
§ 371 (c)(1),
(2), (4) Date: Feb. 22, 2013

(87) PCT Pub. No.: WO2013/121238
PCT Pub. Date: Aug. 22, 2013

(65) Prior Publication Data
US 2014/0347193 A1 Nov. 27, 2014

(51) Int. Cl.
G08C 19/16 (2006.01)
G08C 17/02 (2006.01)
H04L 29/08 (2006.01)
H04W 84/18 (2009.01)

(52) U.S. Cl.
CPC .............. *G08C 17/02* (2013.01); *H04L 67/04* (2013.01); *H04L 67/12* (2013.01); *H04W 84/18* (2013.01)

(58) Field of Classification Search
CPC ................ G01S 13/767; G01S 13/878; G01S 2007/4095; G01S 7/4056; G06K 19/0723; H04B 1/30; H04B 5/00; H04W 28/06; H04W 64/00; H04W 84/18; G06F 21/44; G06F 2221/2143; G06Q 10/087; G08B 13/2417
USPC ....... 340/870.01, 572.1–572.9, 10.33, 10.52, 340/990, 988, 995.1, 539.11, 539.13, 340/539.2, 5.92, 10.42
See application file for complete search history.

(56) References Cited

U.S. PATENT DOCUMENTS

| | | | |
|---|---|---|---|
| 6,957,107 B2 | 10/2005 | Rogers et al. | |
| 7,248,167 B2 * | 7/2007 | Wassingbo | ................. 340/572.1 |
| 7,289,761 B2 | 10/2007 | Mazar | |
| 7,395,117 B2 | 7/2008 | Mazar et al. | |

(Continued)

FOREIGN PATENT DOCUMENTS

| | | |
|---|---|---|
| CN | 1494789 A | 5/2004 |
| CN | 101848126 A | 9/2010 |
| CN | 101894452 A | 11/2010 |

OTHER PUBLICATIONS

Notification of Transmittal of the International Search Report and the Written Opinion of the International Searching Authority, or the Declaration, PCT/IB2012/000256, Jan. 8, 2013.

(Continued)

Primary Examiner — Daniel Previl
(74) Attorney, Agent, or Firm — Myers Bigel, P.A.

(57) ABSTRACT

An electronic device is operated by detecting a tag having a sensor associated therewith and being configured to transmit information over a defined distance using a short range wireless protocol, and receiving sensor information transmitted by the tag over the communication link.

17 Claims, 6 Drawing Sheets

(56) References Cited

U.S. PATENT DOCUMENTS

| | | | |
|---|---|---|---|
| 7,978,062 B2 | 7/2011 | LaLonde et al. | |
| 8,350,694 B1* | 1/2013 | Trundle et al. | 340/539.11 |
| 9,424,417 B2 | 8/2016 | Brown et al. | |
| 9,544,075 B2 | 1/2017 | Altman et al. | |
| 2005/0145187 A1* | 7/2005 | Gray | A01K 11/008 119/174 |
| 2006/0082444 A1 | 4/2006 | Sweeney | |
| 2006/0154642 A1 | 7/2006 | Scannell, Jr. | |
| 2006/0253894 A1 | 11/2006 | Bookman et al. | |
| 2006/0267731 A1 | 11/2006 | Chen | |
| 2008/0004904 A1 | 1/2008 | Tran | |
| 2008/0015013 A1* | 1/2008 | Gelman et al. | 463/25 |
| 2008/0109051 A1 | 5/2008 | Splinter et al. | |
| 2008/0154099 A1 | 6/2008 | Aspel et al. | |
| 2008/0189142 A1 | 8/2008 | Brown et al. | |
| 2008/0207296 A1* | 8/2008 | Lutnick et al. | 463/16 |
| 2008/0252459 A1 | 10/2008 | Butler et al. | |
| 2008/0294019 A1 | 11/2008 | Tran | |
| 2009/0058635 A1 | 3/2009 | LaLonde et al. | |
| 2009/0121890 A1* | 5/2009 | Brown | G06F 21/32 340/686.6 |
| 2009/0222898 A1 | 9/2009 | Veidung | |
| 2009/0289776 A1* | 11/2009 | Moore et al. | 340/10.41 |
| 2009/0325484 A1* | 12/2009 | Lele et al. | 455/41.1 |
| 2010/0088127 A1* | 4/2010 | Betancourt et al. | 705/5 |
| 2010/0176919 A1* | 7/2010 | Myers et al. | 340/5.73 |
| 2010/0289627 A1* | 11/2010 | McAllister et al. | 340/10.42 |
| 2011/0092164 A1 | 4/2011 | Spanhake | |
| 2011/0185202 A1 | 7/2011 | Black et al. | |
| 2011/0227707 A1* | 9/2011 | Zhu | 340/10.4 |
| 2012/0306622 A1 | 12/2012 | Trinh et al. | |
| 2013/0035077 A1 | 2/2013 | Tsai | |
| 2013/0091537 A1* | 4/2013 | Parla et al. | 726/1 |
| 2013/0094538 A1* | 4/2013 | Wang | 375/141 |
| 2013/0145420 A1* | 6/2013 | Ting | H04L 63/08 726/1 |
| 2013/0178163 A1 | 7/2013 | Wang | |
| 2013/0281110 A1 | 10/2013 | Zelinka | |
| 2014/0133656 A1 | 5/2014 | Wurster et al. | |

OTHER PUBLICATIONS

Opperman et al., "A Generic NFC-enabled Measurement System for Remote Monitoring and Control of Client-side Equipment", 2011 Third International Workshop on Near Field Communication, IEEE, Feb. 22, 2011, pp. 44-49.

Notification of Transmittal of the International Search Report and the Written Opinion of the International Searching Authority, or the Declaration, in corresponding PCT Application No. PCT/JP2014/000712, mailed May 14, 2014 (12 pages).

Notification Concerning Transmittal of International Preliminary Report on Patentability in corresponding PCT Application No. PCT/IB2012/000256 mailed Aug. 28, 2014 (11 pages).

Office Action dated Oct. 9, 2017 in corresponding Chinese Application No. 201480014124.3 (28 pages, including English translation).

* cited by examiner

ELECTRONIC DEVICES, METHODS, AND COMPUTER PROGRAM PRODUCTS FOR DETECTING A TAG HAVING A SENSOR ASSOCIATED THEREWITH AND RECEIVING SENSOR INFORMATION THEREFROM

CROSS-REFERENCE TO RELATED APPLICATION

This application is a 35 U.S.C. 0371 national stage application of PCT International Application No. PCT/IB2012/000256, filed on Feb. 13, 2012, the disclosure and contents of which are incorporated by reference herein as if set forth in its entirety.

BACKGROUND OF THE INVENTION

The present invention relates to electronic devices for use in collecting sensor information/data, and, more particularly, to electronic devices, methods, and computer program products for associating tags with sensors to allow sensor data to be collected and communicated through a network of tag reader/detector devices.

It has been proposed in U.S. Pat. No. 7,248,167 ('167 patent") to use Radio Frequency Identification (RFID) signals to provide updated location information about movable objects owned by the owner. However, the methods in the '167 patent describe approaches where the owner or those authorized by the owner are used as RFID in locating the objects. In conventional sensor applications, a sensor is often combined with some type of long/medium range connectivity capability. In some applications, the sensor does not include any connectivity. In these instances, data collection is handled manually, which may be time intensive.

SUMMARY

According to some embodiments of the present invention, an electronic device is operated by detecting a tag having a sensor associated therewith and being configured to transmit information over a defined distance using a short range wireless protocol, and receiving sensor information transmitted by the tag over the communication link.

In other embodiments, the method further comprises sending the sensor information to an application server.

In still other embodiments, the method further comprises receiving a message from the application server providing needed information for interacting with an application residing on the electronic device.

In still other embodiments, the method further comprises receiving a message from the application server providing needed information for interacting with another device.

In still other embodiments, sending the sensor information to the application server comprises sending the sensor information to the application server periodically using a defined schedule.

In still other embodiments, the sensor is configured to generate the sensor information for an event. Sending the sensor information to the application server comprises sending the sensor information to the application server responsive to receipt of the sensor information for a single event at the electronic device without delaying to accumulate sensor information for additional events.

In still other embodiments, the sensor is configured to generate the sensor information for an event. Sending the sensor information to the application server comprises buffering the sensor information for a plurality of events at the electronic device and sending the buffered sensor information to the application server.

In still other embodiments, the sensor is configured to generate the sensor information for an event and the sensor is further configured to buffer the sensor information for a plurality of events. Sending the sensor information to the application server comprises receiving the buffered sensor information transmitted by the tag over the communication link and sending the buffered sensor information to the application server.

In still other embodiments, sending the sensor information to the application server comprises sending the sensor information to the application server based on a transmission bandwidth allocation assigned to the electronic device for communication with the application server.

In still other embodiments, sending the sensor information to the application server comprises receiving metadata transmitted by the tag over the communication link and sending the sensor information to the application server based on the metadata.

In still other embodiments, receiving the sensor information comprises receiving the sensor information based on movement of the electronic device, time of day, sensor activity, and/or power availability.

In still other embodiments, the method further comprises sending a message to the tag to change operational behavior of the tag responsive to the tag being placed in a bi-directional communication mode.

In still other embodiments, the operational behavior comprises operation of the sensor associated with the tag and/or transmission behavior of the tag.

In still other embodiments, sending the message to the tag comprises updating firmware associated with the tag.

In still other embodiments, the message is received from an application server.

In still other embodiments, the electronic device is a mobile terminal.

In still other embodiments, the sensor information comprises authentication information that identifies a person.

In still other embodiments, the authentication information comprises biometric information.

In still other embodiments, the method further comprises sending a message to the tag that is used to operate a device responsive to authenticating an identity of the person.

In still other embodiments, sensing operation of the sensor and/or transmission operation of the tag are changed based on an event sensed by the sensor.

In further embodiments of the present invention, an electronic device comprises a tag reader circuit that is configured to detect a tag having a sensor associated therewith and being configured to transmit information over a defined distance using a short range wireless protocol, and to receive sensor information transmitted by the tag over the communication link.

In still further embodiments, the electronic device further comprises a communications module coupled to the tag reader that is configured to send the sensor information to an application server.

In still further embodiments, the communications module is further configured to receive a message from the application server providing needed information for interacting with an application residing on the electronic device.

In still further embodiments, the communications module is further configured to receive a message from the application server providing needed information for interacting with another device.

In still further embodiments, the electronic device is a mobile terminal.

In other embodiments of the present invention, a computer program product for operating an electronic device comprises a computer readable storage medium having computer readable program code embodied therein. The computer readable program code comprises computer readable program code configured to detect a tag having a sensor associated therewith and being configured to transmit information over a defined distance using a short range wireless protocol, and computer readable program code configured to receive sensor information transmitted by the tag over the communication link.

In further embodiments of the present invention, a communication network is operated by receiving sensor information from a plurality of electronic devices, each electronic device being configured to detect a tag having a sensor associated therewith and to receive the sensor information transmitted by the sensor using a short range wireless protocol and sending a notification to at least one entity based on the sensor information received from the plurality of electronic devices.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
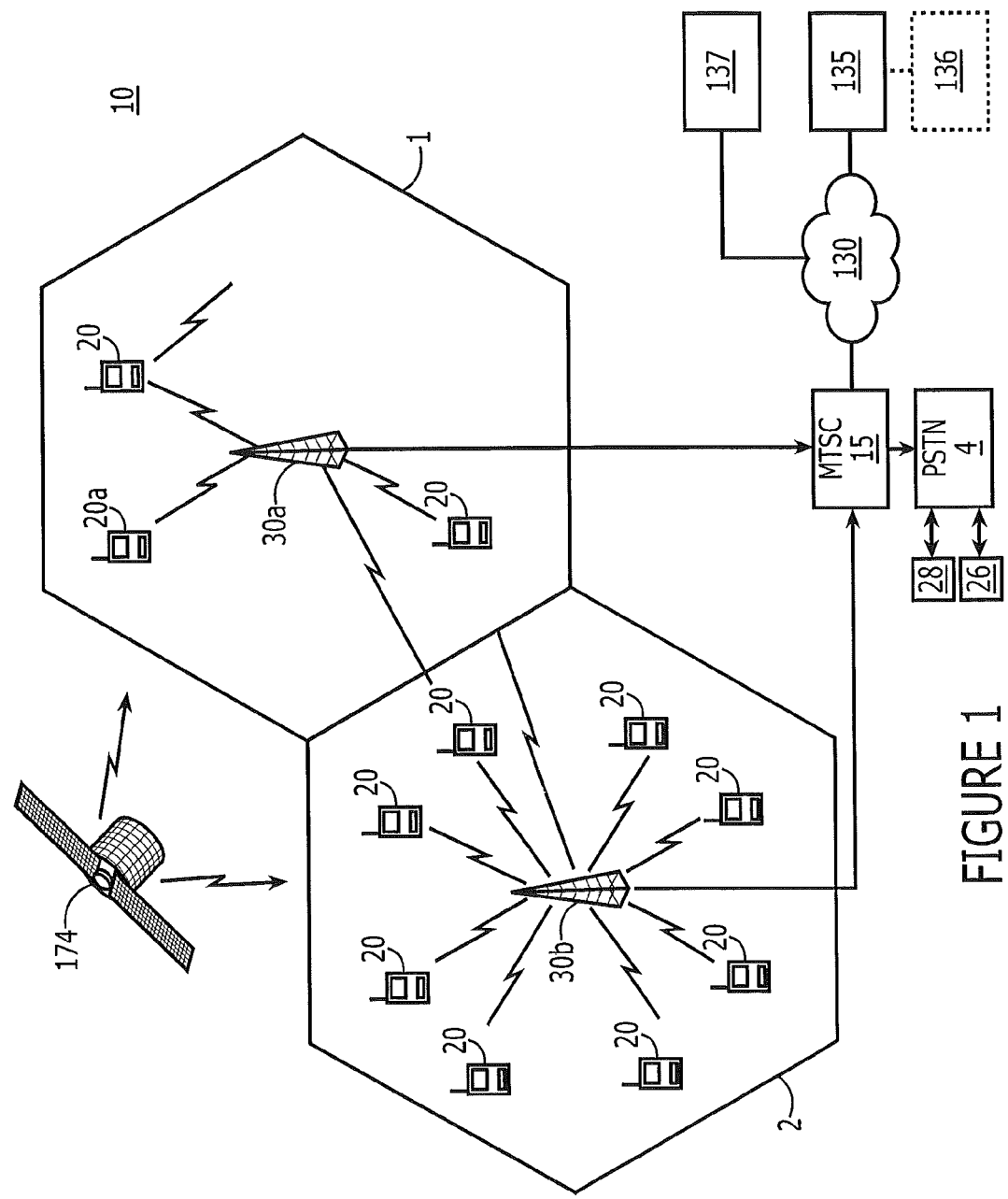
FIG. 1 is a schematic block diagram of a wireless communications network that provides service to mobile terminals according to some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "signal" may take the form of a continuous waveform and/or discrete value(s), such as digital value(s) in a memory or register. As used herein, the terms "module," "circuit," and "controller" may take the form of digital circuitry, such as computer-readable program code executed by an instruction processing device(s) (e.g., general purpose microprocessor and/or digital signal processor), and/or analog circuitry.

It will be understood that embodiments of the invention may use an electronic device, such as a mobile terminal, as a tag detector, which is coupled to a communications network. As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. It will be understood mobile terminals according to various embodiments of the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

For purposes of illustration, embodiments of the present invention are described herein in the context of a mobile terminal. It will be understood, however, that the present invention is not limited to such embodiments and may be embodied generally as an electronic device that is configured to detect a tag associated with an object where the tag has a sensor associated therewith. A communication link can be established with the tag and sensor information can be received by way of the tag over the communication link.

Some embodiments of the present invention stem from a realization that in existing sensor applications, a sensor is often combined with some type of long/medium range connectivity capability. In some applications, the sensor does not include any connectivity. In these instances, data collection is handled manually. According to some embodiments of the present invention, by associating one or more sensors with a tag, sensor information may be transmitted to a tag detector along with the tag identity information, for example. The sensor information/data can be communicated to other application server(s) through the tag detector communication network. Such an architecture may be relatively inexpensive as the cost of sensor devices is generally low and there is no need to equip the sensors with long range communication capabilities. Power consumption is generally low as the use of battery powered sensors may be possible for many applications. Setup primarily involves registering tags associated with the various sensors and the system is generally robust as short range connectivity is generally much less complicated than longer range communication protocols and systems. If one electronic device used as a tag detector is not functioning, another tag detector device may take its place. Moreover, the relatively low cost may allow the deployment of multiple sensors for parallelism. The tag/sensor pairings may also be deployed in a flexible manner as there is no requirement for wireless communication coverage in the deployment area as the tag detector device may receive the sensor data/information by way of the tag and buffer the information, for example, until wireless coverage is available or the data is otherwise uploaded to a communication network.

According to some embodiments of the present invention, an electronic device, such as a mobile terminal, may detect a tag associated with an object, which has a sensor associated therewith. The tag is configured to transmit information over a defined distance using a short range wireless protocol. The electronic device may establish a communication link with the tag and receive sensor information transmitted by the tag over the communication link. The electronic device may send the sensor information to an application server over a communication network. In some applications, the electronic device may receive a message from the application server that provides needed information for interacting with an application residing on the electronic device or for interacting with another device.

The sensor information received by way of the tag may be sent to the application server at various times according to different embodiments of the present invention. For example, the sensor information may be sent to the application server periodically using a defined schedule. In other embodiments, the sensor information associated with a single event may be sent to the application server responsive to receipt of the sensor information at the electronic device without delaying to accumulate additional sensor information associated with additional events. In still other embodiments, the sensor information may be buffered at the tag, sensor, and/or the electronic device until sensor information associated with multiple events accumulates before sending the sensor information to the application server. The sending of sensor information to the application server may also be based on a transmission bandwidth allocated to the electronic device for communication with the application server. In some embodiments, the tag may send metadata with the sensor information to the electronic device, which the electronic device uses to determine when to send the sensor information to the application server. One example is that an "emergency parameter" may be defined, such as a number of seconds, which can be used in conjunction with a comparison of the current time with the time the sensor data was received to determine when the sensor information should be transmitted to the application server. In accordance with various embodiments of the present invention, the metadata may be in plaintext allowing the electronic device to read the information without the need to send the metadata to the application server for decryption or maintain decryption functionality on the electronic device.

To manage power in both the electronic device and the tag/sensor devices, the communication link with the tag may be established based on movement of the electronic device, time of day, sensor activity, and/or power availability.

In some embodiments of the present invention, the tag can be placed in a bi-directional communication mode allowing the electronic device to send a message to the tag to change its operational behavior. In some embodiments, the message may be received from an application server.

FIG. 1 is a diagram that illustrates a wireless communications network (network) 10 that supports communications in which mobile terminals 20 according to embodiments of the invention can be used. Networks 10 are commonly used to provide voice and data communications to subscribers using, for example, the standards described above. According to FIG. 1, the mobile terminals 20 can communicate with each other via a Mobile Telephone Switching Center (MTSC) 15. The mobile terminals 20 can-also communicate with other terminals, such as terminals 26, 28, via a Public Service Telephone Network (PSTN) 4 that is coupled to the network 10. As also shown in FIG. 1, the MTSC 15 is coupled to a computer server 135 supporting a location service 136 (i.e., a location server) via a network 130, such as the Internet. The MTSC 15 is further coupled to a computer server 137 that supports an application that may be configured to receive sensor information/data from an electronic device/mobile terminal according to some embodiments of the present invention. The application server 137 may be configured to process the information/data generated by one or more sensors associated with tags and collected by electronic devices/mobile terminals that include tag reading/detection functionality according to some embodiments of the present invention.

The network 10 is organized as cells 1-2 that collectively can provide service to a geographic region. In particular, each of the cells can provide service to associated sub-regions included in the geographic region covered by the network 10. More or fewer cells can be included in the network 10, and the coverage area for the cells may overlap. Each of the cells may include an associated base station 30*a-b*. The base stations 30*a-b* can provide wireless communications between each other and the mobile terminals 20 in the associated geographic region to allow for communications therebetween.

Each of the base stations 30*a-b* can transmit/receive data to/from the mobile terminals 20 over an associated control channel. For example, the base station 30*a* in cell 1 can communicate with the mobile terminal 20*a* over the control channel 22*a*.

The control channel 22*a* can be used, for example, to page the mobile terminal 20*a* in response to calls directed thereto or to transmit traffic channel assignments to the mobile terminal 20*a* over which a call associated therewith is to be conducted.

The mobile terminals 20 may also be capable of receiving messages from the network 10 over the respective control channel 22. In some embodiments of the present invention, the mobile terminals receive Short Message Service (SMS) or Enhanced Message Service (EMS) formatted messages, Multimedia Message Service (MMS), and/or Smartmessaging™ formatted messages.

A Global Positioning System (GPS) 174 can provide GPS information to the geographic region including cells 1-2 so that the mobile terminals 20 may determine location information. The location information can be applied to identification information received by the mobile terminals from tags coupled to moveable and/or stationary objects. As described herein in greater detail, the network 10 may also provide network location information as the basis for the location information applied by the mobile terminals. In addition, the location information may be provided directly to the server 135 rather than to the mobile terminals 20, which then may provide the location information to the mobile terminals 20.

Figure 2:
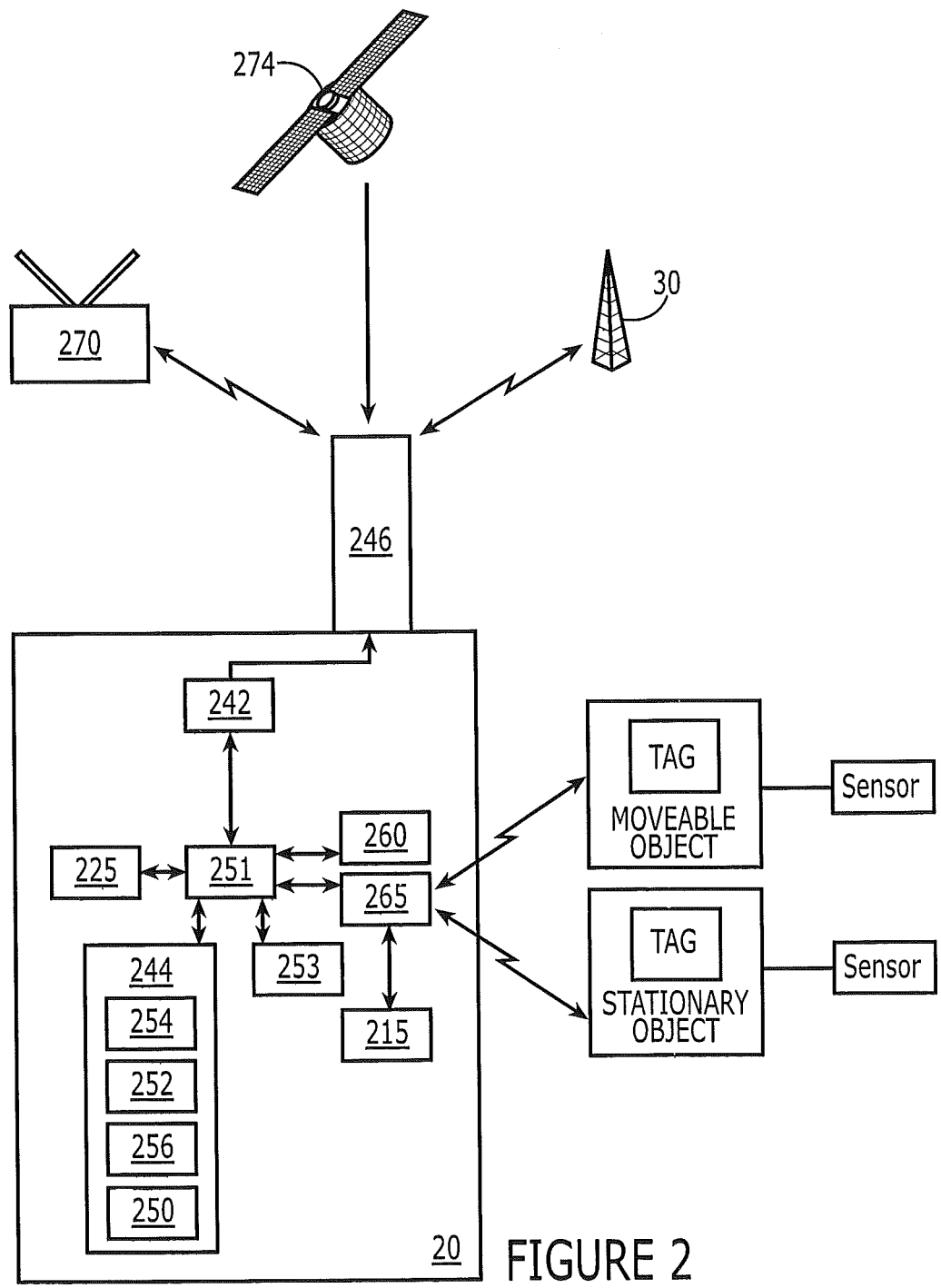
FIG. 2 is a schematic block diagram that illustrates a mobile terminal configured to operate as a tag reader and to collect sensor information via an associated tag in accordance with some embodiments of the present invention.

FIG. 2 is a block diagram that illustrates embodiments of mobile terminals 20 according to some embodiments of the invention. As illustrated in FIG. 2, the mobile terminal 20 includes a transceiver circuit 242 that is operative to transmit and receive radio frequency communication signals to the network 10 via an antenna system 246. The antenna system 246 may include an antenna feed structure and one or more antennas.

A transmitter portion of the transceiver 242 converts information, which is to be transmitted by the mobile terminal 20, into electromagnetic signals suitable for radio communications. A receiver portion of the transceiver 242 demodulates electromagnetic signals, which are received by the mobile terminal 20 from the network 10 to provide the information contained in the signals in a format understandable to the user.

A user interface 244 of the mobile terminal 20 may include a variety of components, such as a display 254, a keypad 252, a speaker 256, and a microphone 250, operations of which are generally known. It will be understood that the operations of the keypad 252 and the display 254 can be provided by a touch screen through which the user can view information, such as computer displayable documents, provide input thereto, and otherwise control the mobile terminal 20.

A processor circuit 251 provides for overall operation of the mobile terminal 20 including coordination of communications via the transceiver circuit 242, the user interface 244, and other components included in the mobile terminal 20. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

Processor circuit 251 may be configured to communicate data over the radio transceiver circuit 242 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, Bluetooth, RFID, and/or WLAN (e.g., 802.11a, 802.11b, 802.11e, 802.11g, and/or 802.11i).

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile terminal 20), Voice Activated Dialing (VAD) services, performing media operations and the like.

The mobile terminal 20 includes a tag reader circuit 265 that is configured to support receiving and formatting for transmission to, for example, a location service tag identifications received from transmitting tags in proximity to the mobile terminal 20. The tag reader circuit 265 is configured to receive tag identifications using a short range wireless transmission protocol even when the mobile terminal 20 does not have any knowledge of the source of the received tag identification. In some embodiments including geographic location services, the tag reader circuit is further configured to format the received tag identification as an ID information report and transmit the ID information report to a geographic location service over a wide area cellular network communicatively coupled to the mobile terminal 20, such as through the base station 30. As the mobile terminal 20 need not have any knowledge of the source of the received tag identification, substantially all users may collect location information for all tags that are in proximity to the tag readers (mobile terminals 20) to support geographic location services. This collection, formatting and transmitting may be done automatically (in background) so that it should not affect the usability of the mobile terminal 20 for the user of the mobile terminal 20.

As will be further described herein, this may be done anonymously to limit or prevent any integrity issues related to collecting geographic location information for tags that the user does not own (or are not owned by someone who has established the user as authorized to act for the owner). The only entity that need know the tags real identity (and owner) may be an Internet cloud based server computer hosting a location service. The location service may only permit location information for the object to be communicated to the object's owner and secondary users permitted by the owner of the tag.

The "tag" can be attached to the moveable and/or stationary objects and may be any shape/size that can be incorporated into/on the moveable and/or stationary objects. The moveable objects can be wallets, keys, mobile telephones, clothing, automobiles, and may even be included in printed inks on, for example, paper. Other stationary objects can also incorporate tags, such as vending machines, alarms, environmental/climate control/monitoring devices, checkpoint sites, user authentication sites, home function locations, e.g., lights, kitchen devices/appliances, heating/air conditioning control, etc. However, the geographic location features discussed above typically are only beneficial for movable objects as the geographic location of fixed objects is generally known and unchanging. The range of the short range wireless transmission protocol and supporting devices assures that any such identified objects are within a close proximity of the mobile terminal 20 at the time of receipt of the tag identification by the mobile, terminal 20.

The information stored in the tag can be identification (ID) information that can uniquely identify the tag and, thus, any object associated with the tag, such as a sensor device. For example, two different objects can have respective tags that each store different ID information that can be used to distinguish the two objects. It will be understood that the interface circuit 265 includes an antenna (not shown) via which the short range wireless signals are received. The short range antenna can be included in the antenna system 246 or can be a separate structure (internal or external). The mobile terminal 20 can also include a tag 215 that includes ID information that uniquely identifies the mobile terminal 20 (as a moveable object according to some embodiments of the invention).

According to some embodiments of the present invention, a tag may have one or more sensor devices associated therewith as shown in FIG. 2. A sensor device may obtain information about a particular device that it is associated with, e.g., the operational state of a particular machine, and/or may collect environmental data generally, e.g., current temperature, humidity, etc. The types of information collected by a sensor are not limited according to embodiments of the present invention as sensors may be used for a variety of purposes. Example sensor applications are described in more detail below. A sensor may be co-located with a tag, such as forming part of a unitary structure or may be physically separate. In some embodiments, the tag and sensor need not be co-located and may be physically remote from one another. In still other embodiments, a sensor and tag combination may communicate with other tags and/or sensor plus tag units to form a communication mesh or network. Sensor data may be shared between the units and data collected for a plurality of tags in the mesh or network may be read from a single tag. Regardless of the positional relationship between the tag and sensor, the tag and sensor are configured to communicate with one another so that sensor data/information may be transferred from the sensor to the tag. In some embodiments, the tag may be used to send information to the sensor from an electronic device/mobile terminal with tag detection/sensor data collection functionality. Once the tag reader circuit 265 detects a tag and establishes a communication link therewith, the tag reader circuit 265 may receive sensor information/data from a sensor associated with the tag by way of the tag.

The mobile terminal 20 may further include a location determination circuit 260. The location determination circuit 260 may be configured to determine the location of the mobile terminal 20 in a variety of ways, some of which will now be described. However, it will be understood that, in some embodiments, the mobile terminal 20 need not know or determine its own location and report the same to the location service where that information is available to the location service from another source. In addition, in embodiments not using geographic location information, the mobile terminal 20 may also not include a location determination circuit 260.

In some embodiments according to the invention, the location determination circuit 260 is a Global Positioning System (GPS) location circuit, including a GPS receiver circuit, that uses, for example, any available GPS or assisted GPS based location approach in conjunction with a GPS satellite system 274. Such approaches are commonly referred to as assisted-GPS, which is defined, for example, in specification numbers 3GPP TS 04.31, 3GPP TS 03.71 and 3GPP TS 04.35. Assisted-GPS approaches are also discussed, for example, in U.S. Pat. Nos. 4,445,118, and 5,418,538, and 5,663,734, and 5,663,735, and 6,433,735, and in published US Patent Application No. US 2003/0011511 A1, the disclosures of which are hereby incorporated herein by reference.

In some embodiments according to the invention, the location determination circuit 260 is a network location circuit that uses location information provided by the network 10, such as a base station ID for the base station 30 servicing the mobile terminal 20 that has location information associated therewith. In some other embodiments according to the present invention, the location determination circuit 260 is a local area network location circuit that uses location information provided via the local wireless network 270 (through a local wireless interface circuit not shown) to determine the location information for the mobile terminal. Other location determination approaches may be used. In some embodiments according to the present invention, the local area network is a WLAN compliant network. In some other embodiments according to the invention, the local wireless network 270 is a Bluetooth compliant interface. In any event, the local wireless network 270 can be used to provide information to the location determination circuit 260 to determine the location information for the mobile terminal 20.

A memory 253 can store computer program instructions that, when executed by the processor circuit 251, carry out the operations described herein and shown in the figures. The memory 253 can be non-volatile memory, such as EEPROM (flash memory), that retains the stored data while power is removed from the memory 253. In some embodiments, the memory 253 can also store a location information table including location information, such as most recently known location information/time information, for objects that are owned by a user associated with the mobile terminal.

Also shown in the embodiments of FIG. 2 is a detected tag registration module 225. The detected tag registration module 225 is configured to receive, using the communication interface 242, a transmitted self identification to detect one of the anonymous tags as a detected tag when the detected tag is activated in the vicinity of the mobile terminal 20. The detected tag registration module 225 is also configured to determine that the detected tag is not yet registered with the location service by obtaining registration information from the network and to transmit, using the communication interface 242, an identification of the tag and the owner (associated with the mobile terminal 20) to the location service to register the tag as belonging to the owner at the location service to limit registration of the tag at the location service. However, in some embodiments related to anonymous communications related to objects, the mobile terminal 20 may not include the detected tag registration module 225.

Figure 3:
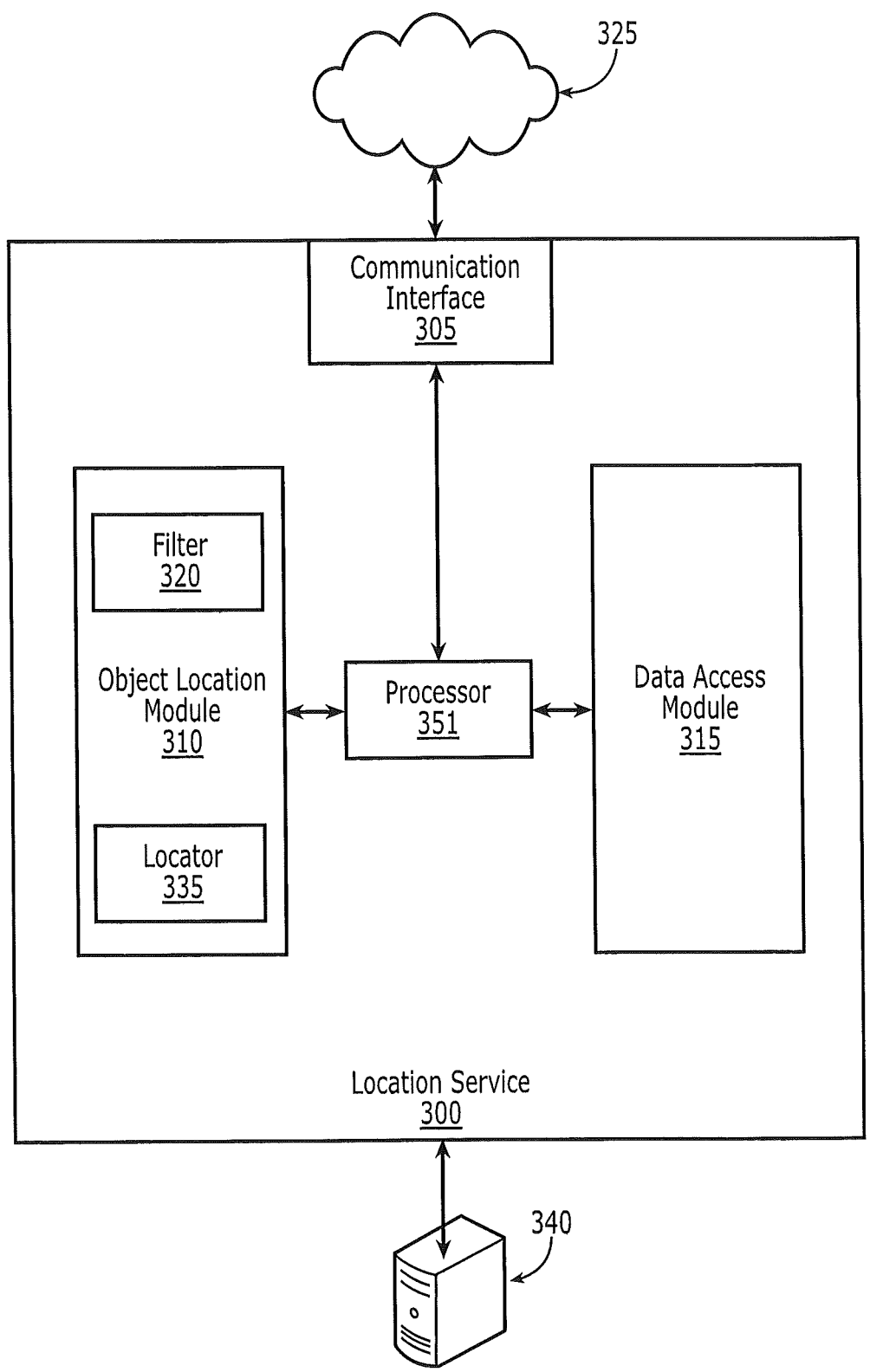
FIGS. 3 and 4 is a block diagram that illustrates a computer server including a location service according to various embodiments of the present invention.

FIG. 3 is a block diagram that illustrates embodiments of a computer server including a location server 300 including a location service that supports geographic location information, which location service may also support registration and/or anonymous communications services according to embodiments of the present invention as described herein. The location service 300 is configured to provide geographic location information associated with the objects. As illustrated in FIG. 3, the location service 300 includes a processor 351, which, to the extent already described with reference to the processor 251 of FIG. 2 will not be further described.

The processor 351 is coupled to a memory 340 that includes, for each of the objects, identification information associated with the respective object and an owner associated with the respective object. As the location service 300 has access to this information, the tag readers providing ID information reports need not to have been provided notification of the identification information associated with the respective objects or of the owners associated with the respective moveable objects. While the memory 340 is shown in FIG. 3 as a data base remote from and communicatively coupled to the location service 340, it will be understood that the memory may be implemented on the computer server hosting the location service 300.

Also shown in FIG. 3 is a communication interface 305 coupled to the processor 351. The communication interface 305 is configured to receive tag identification (ID) information reports from tag readers.

An object location module 310 executing on the processor 351 is configured to update location information associated with the objects, which is stored in the memory 340, responsive to received ID information reports to provide updated location information for the moveable objects. The illustrated embodiments of FIG. 3 also include a data access module 315 executing on the processor 351 that is configured to allow access to the location information associated with respective ones of the objects only to requestors authorized by the owner associated with the respective ones of the objects.

Embodiments of the present invention related to tag registration will now be further described. Tag registration may be used to connect the owner of a tag to the actual physical tag. Typically, tags are not connected to any user/owner when bought from the store. In order to take ownership of the tag, the user/owner must register themselves as owner of the tag before it is used. Common solutions for this kind of secure registration are typically based on a secret password or code (for example, supplied on paper) attached with the physical tag. The password is then used as a key to allow registration of the tag product. In some embodiments as described herein, tags are registered through a tag reader (typically a mobile terminal associated with a user (owner)) at the time when the tag is activated.

As such, registration may be done in a secure manner without the need for any secret code. This may simplify both logistics in production and improve usability for the end consumer (purchaser/owner). As used herein, anonymous tags include short range transmitters so that the tags are detectable only in close proximity of the tag itself (i.e., the transmitted identification of the tag is only received over a limited range). In addition, as described above tags may be anonymous, which means the tag's identity generally cannot be derived by scanning its code on a single occasion. As such, tags may only be used when close to the tag and it can be established in a method that would not allow a previously scanned tag to be used for registration at a later stage. Secure registration may be provided without using a secret code associated with the tag.

The short range transmitters of the tag may be, for example, a low power Bluetooth protocol transmitter or an ANT protocol transmitter. The ANT protocol is designed and marketed by Dynastream Innovations Inc., a Cochrane, Canada based company. The ANT protocol does not use a Media Access Control (MAC) address. As such, anonymity will not be lost by inclusion of a static identifier. In other embodiments, the tag may use the Infrared Data Association (IrDA) protocol to communicate with an electronic device including a tag reader circuit.

In some embodiments, while tags are still in the shop/store, they are not powered, which effectively makes unlawful registration while in the shop impossible. Registration of a newly purchased tag using a mobile terminal as a tag reader may include in some embodiments:

1) Unpacking the tag from its packaging.
2) Activation by the user of a registered new tag application in the user's mobile terminal.
3) Authentication of the user towards a location service using, for example, OpenID or similar authentication protocol for a mobile terminal.
4) The tag is powered by pushing a one-way button (or removing a slip from its case), for example. Such an approach may enable the tag to start beacon transmission of its self-identity. The one-way operation of the activation should maintain transmission of the tag with its self-identity beacon until its internal battery is exhausted as a user may not turn the power off using the one-way button.
5) The mobile terminal/tag scanner then scans for new unregistered tags in its proximity. The mobile terminal may be configured to only present unregistered tags and may be furthered configured to present the closest tag first.
6) The tag is then sensed by the mobile terminal and may be presented to the user, for example, on a display of the mobile terminal.
7) The user may select the new tag as the target for registration and, by this action, accept him or herself as the owner for the new tag. The ownership is then stored at the location service. In some embodiments, tag registration for this specific tag is only allowed once.

Embodiments using such a registration approach may provide for a simple but also very secure registration process. In some embodiments, if the tag registration has failed and an unlawful user has taken ownership of the tag, it is still possible to use a secret code that allows the tag to be unregistered by the valid owner (for example, by over-riding the initial registration). This may enable the tag to be registered again following the scenario described of failed registration. In such embodiments, the tag may be powered during re-registration but registration will not be allowed until it has been unregistered (deregistered).

Unregistration/deregistration may also be performed without the use of any code by the lawful/valid owner of the tag. Because an owner is authenticated towards the location service, they may be allowed to unregister any of the tags that they have previously registered. Such an approach may be used to, for example, transfer tags to a new owner after purchase by the original owner.

The owner of a tag may be permitted to relay any kind of permission to other users once registered. For instance, it may be useful to enable tags to be shared between family members. Permission transfer may be enabled by generating a secret key, specific for the tag, which is then transmitted. The transmission may be over any suitable communication channel, such as short message service (SMS) or email. Other ways of transmitting permissions are also possible. In some embodiments, permissions are transferred by transmitting a secret key known only to owner, location service and, after transmission, the other selected user. The secret key in some embodiments is temporary and only valid for a limited number of other users.

In further embodiments, it is possible to support a public registration identity of the tag that is only used during registration. The public registration identity/code may be a single or few letters or digits and is not the tag's transmitted self-identity (which is typically 64 bits). The registration code may, for example, be printed on the tag itself or on a label attached to the tag. During registration, the public code may be retrieved from the location service to differentiate between different tags that are all unregistered and powered. In some embodiments, the public code may be provided in plain text. This may be useful, for example, in a corporate environment where many tags are registered at once in a single local vicinity.

Figure 4:
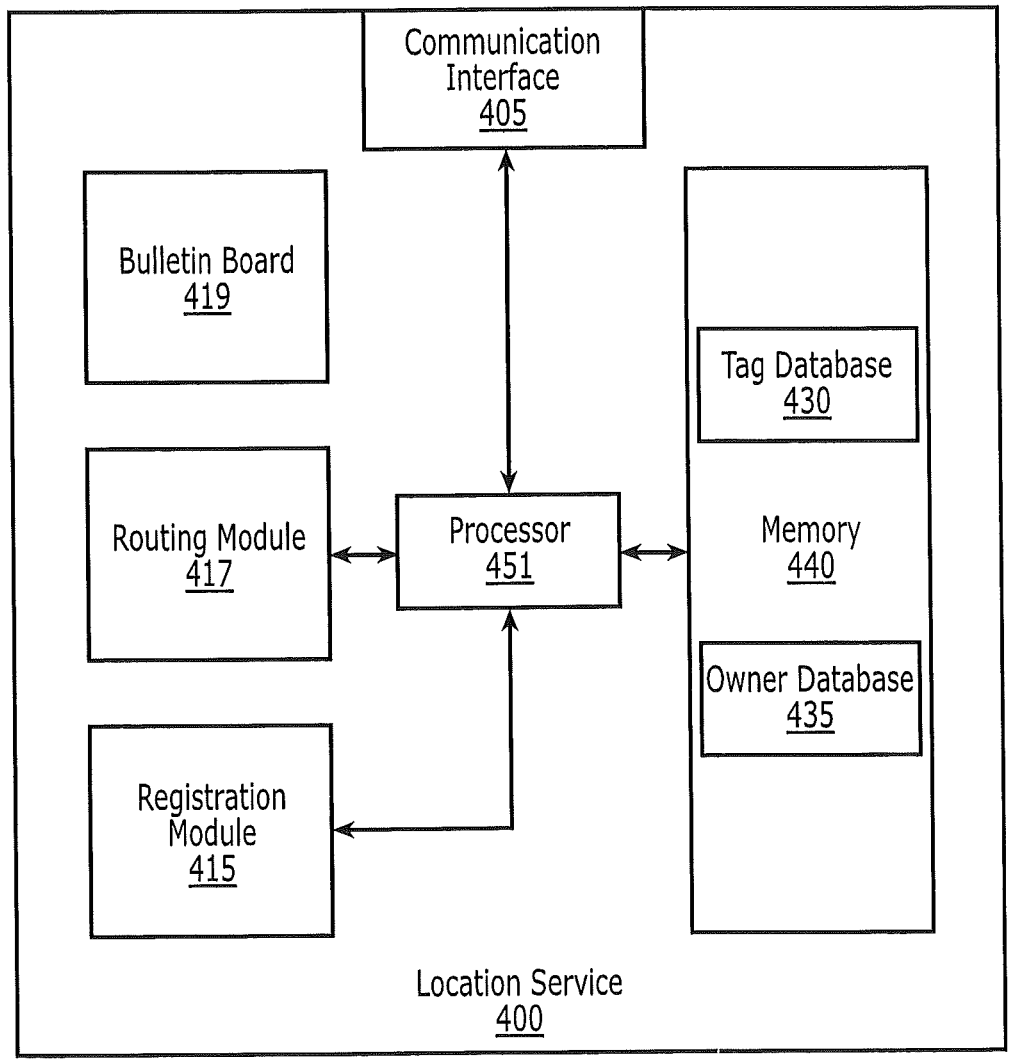

FIG. 4 is a block diagram that illustrates embodiments of a computer server including a location server 400 providing a location service that supports tag registration. The location service 400 may also support geographic location as described previously and/or anonymous communications services as described later herein. The location service 400 is configured to provide information associated with anonymous tags that are registered with the location service 400. As illustrated in FIG. 4, the location service 400 includes a processor 451, which, to the extent already described with reference to the processors 251, 351 will not be further described.

The processor 451 is coupled to a memory 440 that includes, for each of the objects, a registered tag database 430 and an owner database 435. As the location service 400 has access to this information, the tag readers communicating therewith need not to have been provided notification of the identification information associated with the respective tags or of the owners associated with the respective tags. While the memory 440 is shown in FIG. 4 as an internal memory to the computer server hosting the location service 400, as described with reference to FIG. 3, the data base may be remote from and communicatively coupled to the location service 400.

The registered tag database 430 includes, for each of a plurality of registered ones of the anonymous tags, a self identification and an owner associated with each of the registered ones of the anonymous tags. The database 430 may also include information related to other users who have been authorized by the owner to have at least some access to information related to the tag. The owner database 435 includes, for each of a plurality of registered owners, at least one tag reader and/or other communication device associated with each of the registered owners.

Also shown in FIG. 4 is a communication interface 405 coupled to the processor 451. The communication interface 405 is configured to receive a registration request, which includes identification of one of the anonymous tags, from one of the tag readers of one of the registered owners.

The location service 400 may include a registration module 415 executing on the processor 451 is configured to determine if the one of the anonymous tags identified in a received registration request is already registered using the registered tag database 430. The registration module 415 is also configured to update the registered tag database 430 to include an entry for the one of the anonymous tags identified in the received registration request to register the tag identified in the received registration request. Based on the information in the owner database 435, the tag is registered as associated with the owner identified as associated the with tag reader (e.g., mobile terminal), by login of the owner at some earlier time or otherwise as discussed above, from which the request was received. In other words, by associating the request with the owner, the communication from the tag reader is considered to be valid (i.e., is secured), thereby authenticating the originating tag reader. In some embodiments, the owner database 435 may be used by the location service 400 to identify the owner based on the identity of the mobile terminal sending the registration request.

The location service 400 may include a routing module 417 that supports communications related to detection of anonymous tags. The routing module 417 is configured to identifying an object associated with an ID information report that includes a tag self identification received from the mobile terminal 20 and to determine an owner associated with the identified object using the registered tag database 430. The routing module 417 is also configured to route a communication, using the communication interface 405, between a user associated with a tag detector that detects the tag, such as a first mobile terminal and a second mobile terminal (or other communication device communicatively coupled to the service) associated with the owner of the tag (as identified in the owner database 435) responsive to the received tag identification. The identified device in the owner database 435 may stay associated with the owner until removed or may only remain associated with the owner for a particular interval, such as while the owner is logged into the service using the device. This routing is provided without identifying the user of the first mobile terminal to the owner or the owner to the user of the first mobile terminal. Also shown in FIG. 4, is a bulletin board 419, supported by the location service 400. Communications routed by the routing module 415 may be routed to the bulletin board 419, which may be accessible for reading and/or writing communications by all of the users of the location service 400.

Operations for registering and communications related to tagged objects are described in detail in International Application No. PCT/IB2011/000872, entitled "Methods, Systems and Computer Program Products for Registration of and Anonymous Communications Related to Tagged Objects," filed 20 Apr. 2011, the disclosure of which is hereby incorporated herein by reference.

Operations for anonymous tracking of objects are described in detail in International Application No. PCT/IB2011/000867, entitled "Methods, Systems and Computer Program Products for Anonymous Tracking of Objects," filed 20 Apr. 2011, the disclosure of which is hereby incorporated herein by reference.

Figure 5:
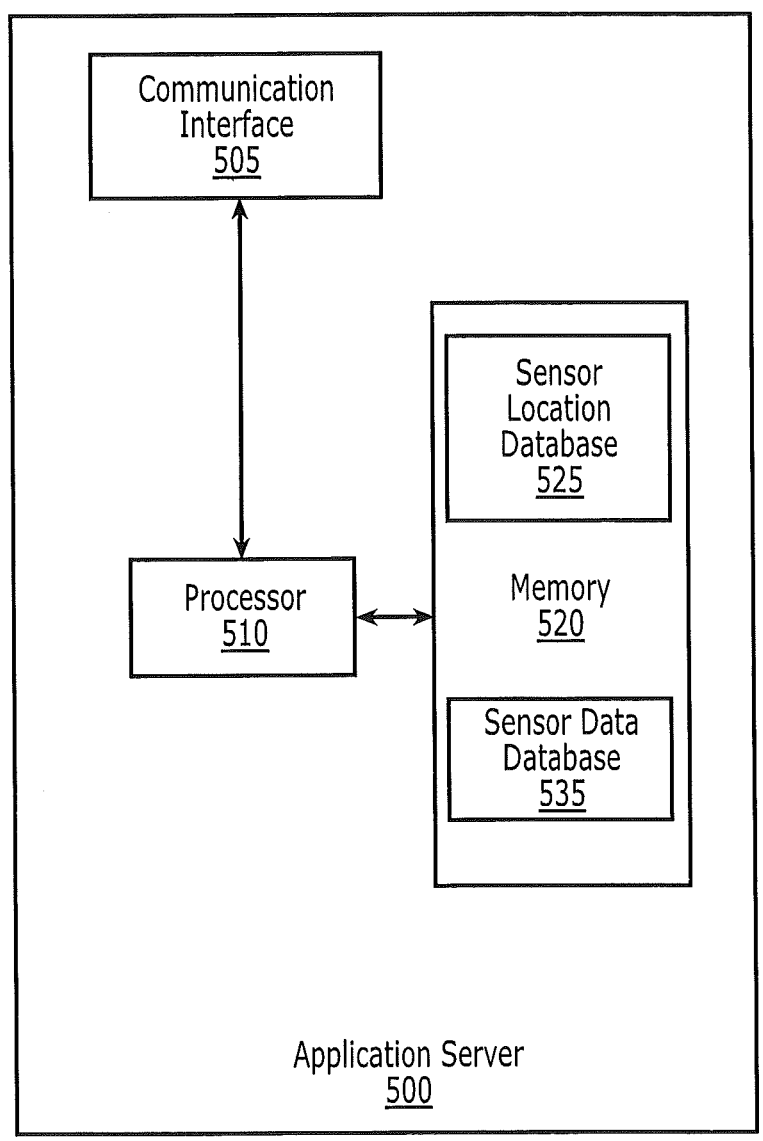
FIG. 5 is a block diagram that illustrates an application server according to some embodiments of the present invention.

FIG. 5 is a block diagram of an application server 500 in accordance with some embodiments of the present invention. The application server 500 includes a processor 510 that is coupled to a communication interface 505 and memory 520 as shown. The processor 510, which, to the extent already described with reference to the processors 251, 351, and 451 will not be further described.

The memory 520 includes a sensor location database 525 and a sensor data database 535. The sensor location database 525 may include information obtained from one or more electronic devices/mobile terminals that have detected a tag having a sensor associated therewith and have received sensor information therefrom and/or information from a location service 300/400 described above. The sensor information is communicated from the electronic device/mobile terminal to the application server 500 via the communication interface 505. As each sensor is associated with a tag that has an identity and trackable location as described above, the application server 500 may include this identity information in the sensor location database 525 and supplement the tag identity information with location information for the tag obtained from the location service 300/400. Such tag location information may also be indicative of the sensor locations if the sensors are co-located with the tags and/or if the sensors have a known positional/geographic relationship with the tags. It will be understood, however, that other embodiments of the present invention may not track locations of the tags and sensor combination as such location information is not needed to collect sensor data through a tag.

The sensor data database 535 may include information associated with the particular variable the sensor is designed monitor/collect data on. For example, if the sensor is designed to measure temperature, the sensor data database may include temperature readings. The processor 510 may process the information collected from the sensors via the electronic devices/mobile terminals equipped with tag reading/sensor data collection functionality described herein according to some embodiments of the present invention. In some embodiments, the application server 500 is not equipped to interpret or process the sensor data that it receives. The data may be accessed, for example, via a Web interface or otherwise made accessible so that another entity can process and interpret the sensor data. The application server 500 may communicate with individual electronic devices/mobile terminals equipped with the tag reading/sensor data collection functionality to affect operations thereon and/or to communicate with the tags and/or sensors to affect their operations. For example, an application server 500 may update firmware on a tag and/or sensor via an electronic device/mobile terminal equipped with the tag reading/sensor data collection functionality.

It is to be understood that embodiments of the present invention are not limited to the particular configuration shown in FIGS. 1 through 5, but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 5 may be implemented as a single processor system or a multi-processor system in accordance with various embodiments of the present invention.

Computer program code for carrying out operations of devices and/or systems discussed above with respect to FIGS. 1-5 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, and/or computer program products in accordance with some embodiments of the invention.

These flowchart and/or block diagrams further illustrate exemplary operations of detecting a tag having a sensor associated therewith and receiving sensor information therefrom. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 6:
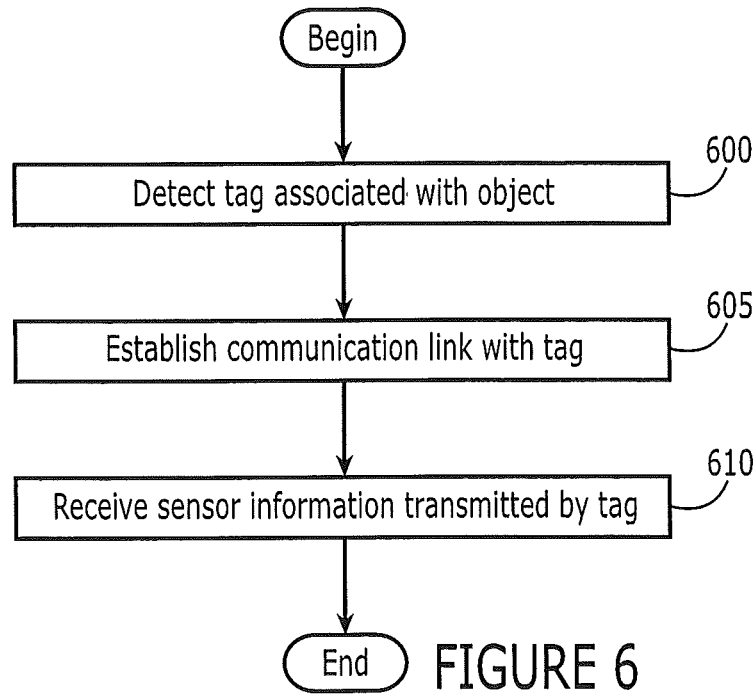
FIGS. 6 and 7 are flowcharts that illustrate detecting a tag having a sensor associated therewith and receiving sensor information therefrom.

Referring now to FIG. 6, operations begin at block 600 in which an electronic device/mobile terminal detects a tag associated with an object. The tag has one or more sensors associated therewith. The tag is configured to transmit information over a defined distance using a short range wireless protocol. At block 605, the electronic device/mobile terminal establishes a communication link with the tag. In some embodiments, the tag broadcasts information and the electronic device/mobile terminal need only listen to broadcasts from a tag. In other embodiments, a communication link is established between the electronic device/mobile terminal and the tag before either entity transmits information. To manage power in both the electronic device and the tag/sensor devices, the communication link with the tag may be established based on movement of the electronic device, time of day, sensor activity, and/or power availability. The electronic device/mobile terminal receives sensor information/data transmitted by the tag at block 610.

Figure 7:
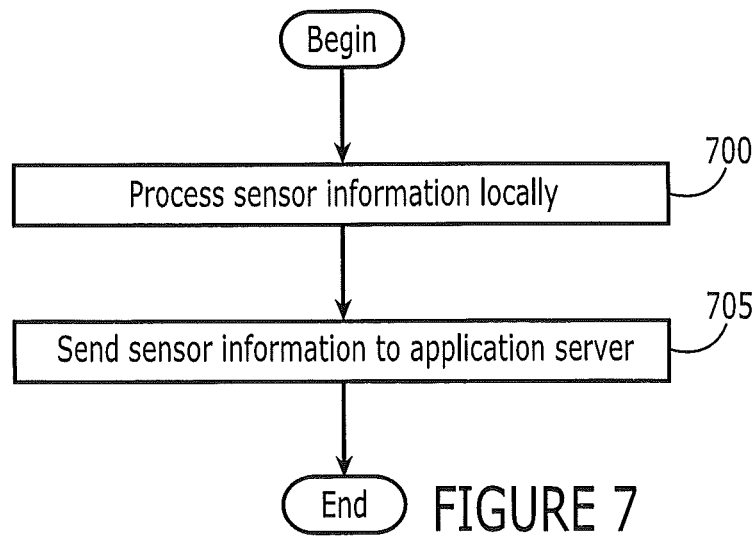

Referring now to FIG. 7, operations for processing the sensor information received at the electronic device/mobile terminal begin at block 700 where the electronic device/mobile terminal optionally processes the sensor information locally. For example, the electronic device/mobile terminal may have an application residing thereon for making use of the sensor data. For example, the tag and sensor may be part of a pedometer and the sensor data may be processed and displayed on a user's mobile terminal to provide information to the user on distance traveled, steps taken, and the like. The sensor information may also be processed by an application server, such as application server 500, residing in the network cloud, for example. Thus, at block 705, the electronic device/mobile terminal may send the sensor information to an application sever over a communication network. In some applications, the electronic device may receive a message from the application server that provides needed information for interacting with an application residing on the electronic device or for interacting with another device.

The sensor information received by way of the tag may be sent to the application server at various times according to different embodiments of the present invention. For example, the sensor information may be sent to the application server periodically using a defined schedule. In other embodiments, the sensor information associated with a single event may be sent to the application server responsive to receipt of the sensor information at the electronic device without delaying to accumulate additional sensor information associated with additional events. In still other embodiments, the sensor information may be buffered at the tag, sensor, and/or the electronic device/mobile terminal until sensor information associated with multiple events accumulates before sending the sensor information to the application server. The sending of sensor information to the application server may also be based on a transmission bandwidth allocated to the electronic device for communication with the application server. In some embodiments, the tag may send metadata with the sensor information to the electronic device, which the electronic device uses to determine when to send the sensor information to the application server.

In some embodiments of the present invention, the tag can be placed in a bi-directional communication mode allowing the electronic device to send a message to the tag to change its operational behavior. In some embodiments, the message may originate from an application server.

The flowcharts of FIGS. 6 and 7 illustrate the architecture, functionality, and operations of embodiments of methods, electronic devices, and/or computer program products for detecting a tag having a sensor associated therewith and receiving sensor information therefrom. In this regard, each block represents a module, segment, or portion of code, which comprises one or more executable instructions for implementing the specified logical function(s). It should also be noted that in other implementations, the function(s) noted in the blocks may occur out of the order noted in FIGS. 6 and 7. For example, two blocks shown in succession may, in fact, be executed substantially concurrently or the blocks may sometimes be executed in the reverse order, depending on the functionality involved.

Embodiments of the present invention may be illustrated by way of example. The following non-limiting applications for associating sensors with tags to allow electronic devices/mobile terminals to collect sensor information by way of the tag and communicate such information to an application server, for example, are for purposes of illustrating various embodiments of the present invention.

EXAMPLE 1

Transmission of Machine to Machine (M2M) Data

Vending machine data (coin counter, need of refill, usage statistics, accumulated wear measurement etc.) may be sent to an application server through use of sensors having tag(s) associated therewith. Measurements of variables associated with automated machinery may use a similar configuration. Embodiments of the present invention may also be used to track the availability of free city bikes. A M2M sensor may change sensing or transmission data size based on time schedule and/or on certain limit criteria. For example, in the case of a coffee machine, data may only be sent via the associated tag when the machine is out of coffee.

EXAMPLE 2

Alarms

Heat and/or smoke sensors may be associated with tags. An application server may use the collected data to determine if there is a fire, where it is, and send a fire alarm to all mobile phones close to the fire. Different kinds of sensors like radiation, pressure, vibration may be used to identify different catastrophic events like explosions, nuclear disaster and earthquakes. Multiple sensor measurements submitted via many tag readers/detectors may be used by a cloud application server to determine the likeliness, location, and size of a fire. Existing sensor networks may not have the scale and size to detect and locate events with the same precision. Advantageously, people close to a dangerous event may be quickly identified and targeted for information via a mobile network or other communication channel.

EXAMPLE 3

Climate Control/Transport

Sensors such as temperature, humidity, atmospheric pressure, light, etc. may be used to measure the quality of sensitive goods like food. A climate control sensor may be configured to wait until a package is delivered and opened (triggered by e.g. light sensor) before sending data via an associated tag.

EXAMPLE 4

Continuous Health Measurement

Different sensors for temperature, blood pressure, oxygen level etc. may be used to allow continuous measurement of a person's or animal's vital signs. Different sensors may be added independent of the tag reader/detector. New applications can therefore be developed in the network cloud without changing any of the clients. Sensors may be used to detect if medication is taken by measuring usage (or movement of) of the pill dispenser.

EXAMPLE 5

User Authentication

A tag can be used for different kinds of authentication. The tag can either be public, and used by many, or personal and used by a single user. The tag may also include biometric identification to increase the authenticity of the person identified. A public tag may include a fingerprint sensor where the biometric information is sent to the application server in the cloud through a tag reader/detector. An encrypted "unlock" message can then be sent back through the tag reader/detector to the tag which in turn unlocks a door or performs other action(s). The source tag, tag readers/detectors (up and down from the network cloud) and target tag are all independent and can be different entities, e.g., one tag may be connected to the fingerprint sensor while another is connected to the lock. Tags may also be personal and carried by an individual user (like a credit card or key). Personal tags may include biometrical sensing or include a simple activation button. Cloud issued "unlock keys" may also be targeted to a specific tag reader/detector (and not a tag). For instance a personal password could be encrypted and sent to a tag reader/detector used to login to a specific service (e.g. a social media website login). The unlock key may also be sent directly towards a service. In this case the cloud service itself acts as authentication authority towards the target service. The tag location may be used as one criterion to allow access. Many different policies and use cases are possible dependent on the application.

EXAMPLE 6

Function Detector

An accelerometer may be used to detect if an object is functional/active by measuring movement, e.g., elevators, doors, vehicles, animals, humans, etc., can be detected by detecting movement. When an entity has been static for a certain period of time, an alarm could be issued. A tag may send generic (accelerometer) movement data to an application server in the cloud continuously. The application server may determine if the entity is functional or not depending on the type of entity. Advantageously, the same tag and sensor combination may be used for many different types of entities.

EXAMPLE 7

Golf Radar

By including sensors, such as an accelerometer, gyroscope, and/or compass into a golf ball it may be possible to detect ball direction and speed after the ball is struck and, as a result, it may be possible to approximate a landing spot. The club hit could also activate extended sensing and transmission of sensor data along the ball's trajectory. After the ball has landed, the tag and/or sensor may be deactivated to reduce power consumption. Ball direction/location may also be determined by using triangulation from multiple tag readers/detectors located at different locations that collect transmissions from the ball in flight. The gyroscope, accelerometer, and compass data may also be used to determine trajectory and rotation of the ball.

EXAMPLE 8

Determine Time of Theft

An accelerometer and clock may be used to determine the exact time an object was moved after it has been stolen. This may help with crime investigation.

EXAMPLE 9

Improved Pedometer

Using a pedometer sensor with a tag may allow both distance, steps, and route to be approximated and uploaded to an application server in the network cloud. For example, a single mobile terminal with tag reader/sensor data collection functionality described above may be used to track the route of a group of runners with acceptable precision.

EXAMPLE 10

Smart House

Using different types of sensors in a residence may enable tracking of entrance through doors, on/off detection of kitchen appliances, light detection, power meter monitoring, and the like.

EXAMPLE 11

Internal Monitoring

The battery level of a tag or sensor may be read and reviewed to determine when a tag and/or sensor need to be replaced or attended to.

Many variations and modifications can be made to the exemplary embodiments without substantially departing from the principles of the present invention. All such variations and modifications are intended to be included herein within the scope of the present invention, as set forth in the following claims.

That which is claimed:

1. A method of operating an electronic device, comprising:
   detecting, using a tag reader circuit, a tag having a sensor associated with the tag, the tag being configured to communicate with the sensor to receive sensor information from the sensor and being further configured to transmit information over a defined distance using a short range wireless protocol via a communication link;
   receiving, via the tag reader circuit, the sensor information transmitted by the tag over the communication link;
   sending the sensor information to an application server periodically using a defined schedule; and
   sending a message to the tag, the message used to operate a device responsive to authenticating an identity of a person;
   wherein the sensor information comprises authentication information that identifies the person.

2. The method of claim 1, further comprising:
   receiving a message from the application server providing needed information for interacting with an application residing on the electronic device.

3. The method of claim 1, further comprising:
receiving a message from the application server providing needed information for interacting with another device.

4. The method of claim 1, wherein the sensor is configured to generate the sensor information for an event and wherein sending the sensor information to the application server comprises:
sending the sensor information to the application server responsive to receipt of the sensor information for a single event at the electronic device without delaying to accumulate sensor information for additional events.

5. The method of claim 1, wherein the sensor is configured to generate the sensor information for an event and wherein sending the sensor information to the application server comprises:
buffering the sensor information for a plurality of events at the electronic device; and
sending the buffered sensor information to the application server.

6. The method of claim 1, wherein the sensor is configured to generate the sensor information for an event and the sensor is further configured to buffer the sensor information for a plurality of events, and wherein sending the sensor information to the application server comprises:
receiving the buffered sensor information transmitted by the tag over the communication link; and
sending the buffered sensor information to the application server.

7. The method of claim 1, wherein sending the sensor information to the application server comprises:
sending the sensor information to the application server based on a transmission bandwidth allocation assigned to the electronic device for communication with the application server.

8. The method of claim 1, wherein sending the sensor information to the application server comprises:
receiving metadata transmitted by the tag over the communication link; and
sending the sensor information to the application server based on the metadata.

9. The method of claim 1, wherein receiving the sensor information comprises:
receiving the sensor information based on movement of the electronic device, time of day, sensor activity, and/or power availability.

10. The method of claim 1, wherein the electronic device is a mobile terminal.

11. The method of claim 1, wherein the authentication information comprises biometric information.

12. The method of claim 1, wherein a sensing operation of the sensor and/or a transmission operation of the tag are changed based on an event sensed by the sensor.

13. An electronic device,
a tag reader circuit configured to detect a tag having a sensor associated with the tag where the tag is configured to communicate with the sensor to receive sensor information from the sensor, the tag reader circuit being further configured to transmit information over a defined distance using a short range wireless protocol via a communication link, and the tag reader circuit being further configured to receive the sensor information transmitted by the tag over the communication link, and to send a message to the tag, the message used to operate a device responsive to authenticating an identity of a person; and
a communications module coupled to the tag reader circuit that is configured to send the sensor information to an application server periodically using a defined schedule;
wherein the sensor information comprises authentication information that identifies the person.

14. The electronic device of claim 13, wherein the communications module is further configured to receive a message from the application server providing needed information for interacting with an application residing on the electronic device.

15. The electronic device of claim 13, wherein the communications module is further configured to receive a message from the application server providing needed information for interacting with another device.

16. The electronic device of claim 13, wherein the electronic device is a mobile terminal.

17. An article of manufacture for operating an electronic device, comprising:
a non-transitory computer readable storage medium having computer readable program code embodied in the computer readable storage medium that is executable by a processor to perform operations comprising:
detecting, using a tag reader circuit, a tag having a sensor associated with the tag, the tag being configured to communicate with the sensor to receive sensor information from the sensor and being further configured to transmit information over a defined distance using a short range wireless protocol via a communication link;
receiving, via the tag reader circuit, the sensor information transmitted by the tag over the communication link;
sending the sensor information to an application server periodically using a defined schedule; and
sending a message to the tag, the message used to operate a device responsive to authenticating an identity of a person;
wherein the sensor information comprises authentication information that identifies the person.

* * * * *